(12) United States Patent
Caraveo et al.

(10) Patent No.: US 6,224,116 B1
(45) Date of Patent: May 1, 2001

(54) DEVICE FOR HOLDING PIPE ON A BRANCH CONNECTOR

(75) Inventors: Philippe Caraveo, Saint Clement; Patrick Le Cointe, Bouffemont; Michel Taillade, Paris, all of (FR)

(73) Assignee: Gaz de France (G. D. F.) Service National (FR)

( * ) Notice: Subject to any disclaimer, the term of this patent is extended or adjusted under 35 U.S.C. 154(b) by 0 days.

(21) Appl. No.: 09/318,936

(22) Filed: May 26, 1999

(30) Foreign Application Priority Data

May 27, 1998 (FR) .................................................. 98 06665

(51) Int. Cl.⁷ ................................................... F16L 21/06
(52) U.S. Cl. .......................... 285/197; 285/197; 285/114
(58) Field of Search ..................................... 285/114, 197, 285/198, 199, 21.1, 21.2; 137/317, 318

(56) References Cited

U.S. PATENT DOCUMENTS

| | | | |
|---|---|---|---|
| 696,230 | * | 3/1902 | Fielding ................................ 285/180 |
| 1,545,493 | * | 7/1925 | Hoffman .............................. 285/198 |
| 2,689,142 | * | 9/1954 | Glayzer ................................ 285/198 |
| 2,790,652 | * | 4/1957 | Risley et al. ......................... 285/197 |
| 4,018,464 | * | 4/1977 | Acda et al. .......................... 285/197 |
| 4,307,903 | * | 12/1981 | Wallace ............................... 285/114 |
| 4,631,056 | * | 12/1986 | Dye ......................................... 285/3 |
| 4,647,073 | * | 3/1987 | Kosaka ................................ 285/197 |
| 6,017,064 | * | 1/2000 | Harrington .......................... 285/197 |
| 6,065,782 | * | 5/2000 | Allen, Jr. ............................. 285/114 |

FOREIGN PATENT DOCUMENTS 0536427  4/1993  (EP) .
0580222  1/1994  (EP) .

* cited by examiner

*Primary Examiner*—Eric K. Nicholson
(74) *Attorney, Agent, or Firm*—Rothwell, Figg, Ernst & Manbeck

(57) ABSTRACT

The invention relates to a device for positioning and holding together a secondary pipe on a branch connector before the branch connector is mounted on a buried main pipe for transporting fluid.

Figure 7:
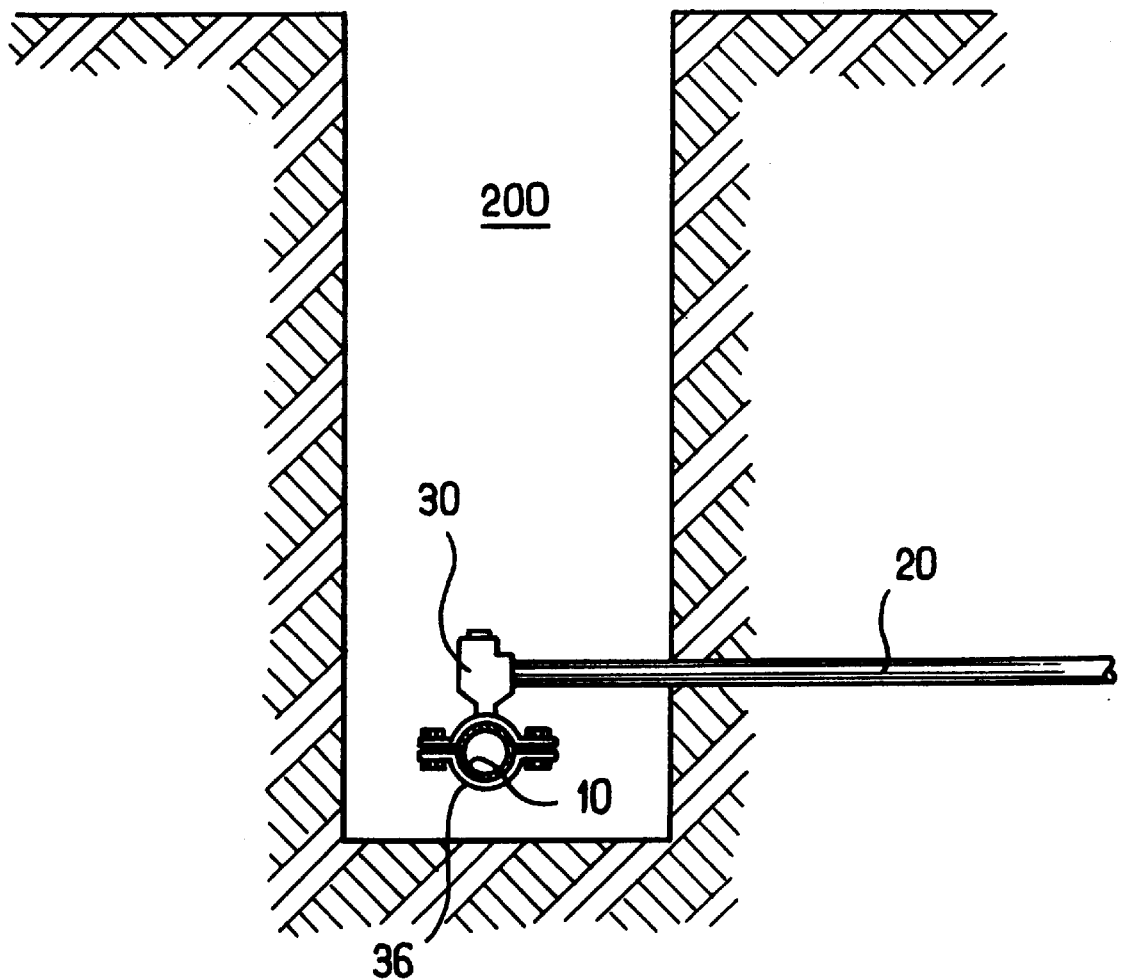

The device rests solely on the secondary pipe and on the branch connector away from the main pipe.

9 Claims, 4 Drawing Sheets

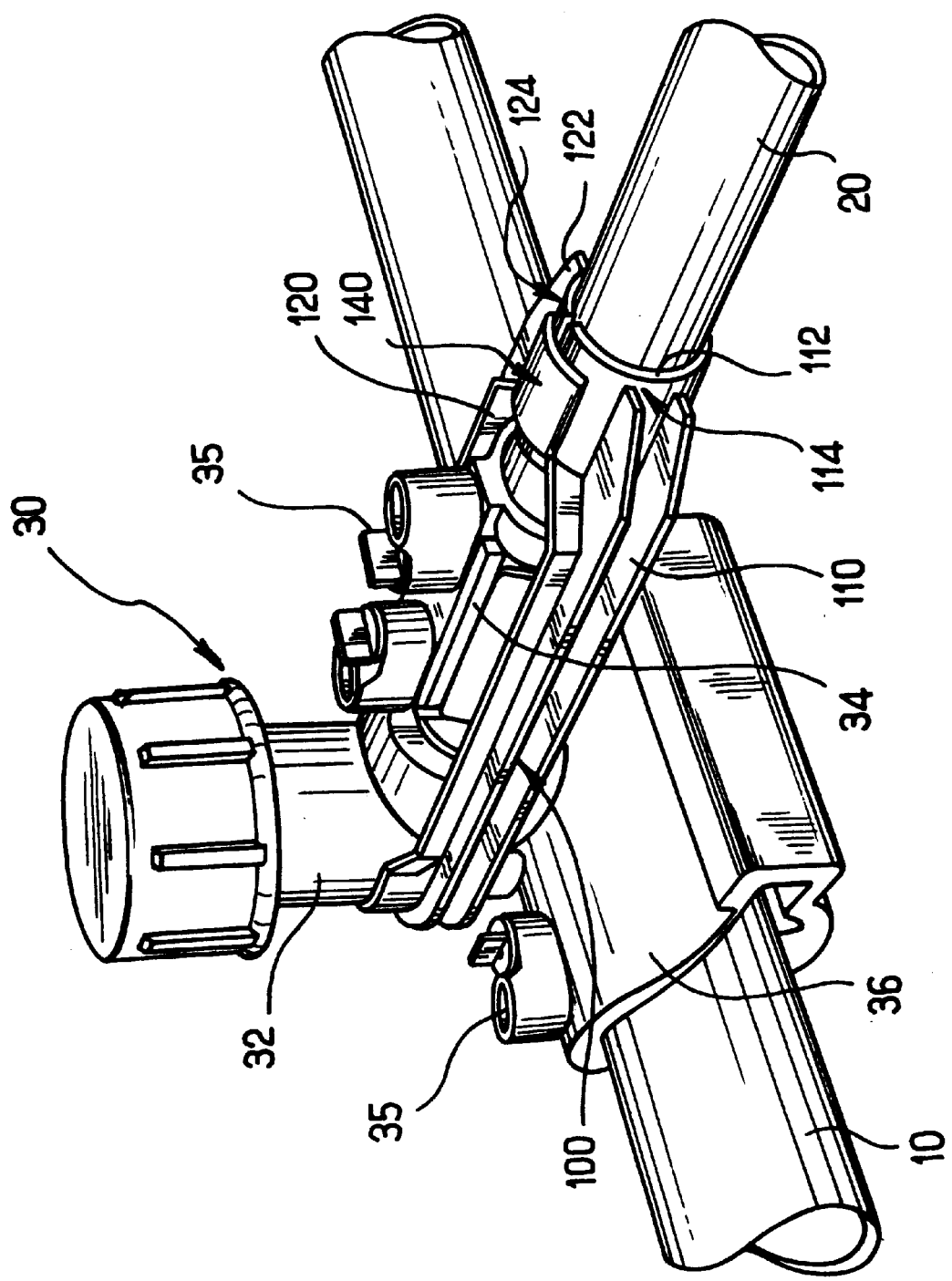
FIG_1

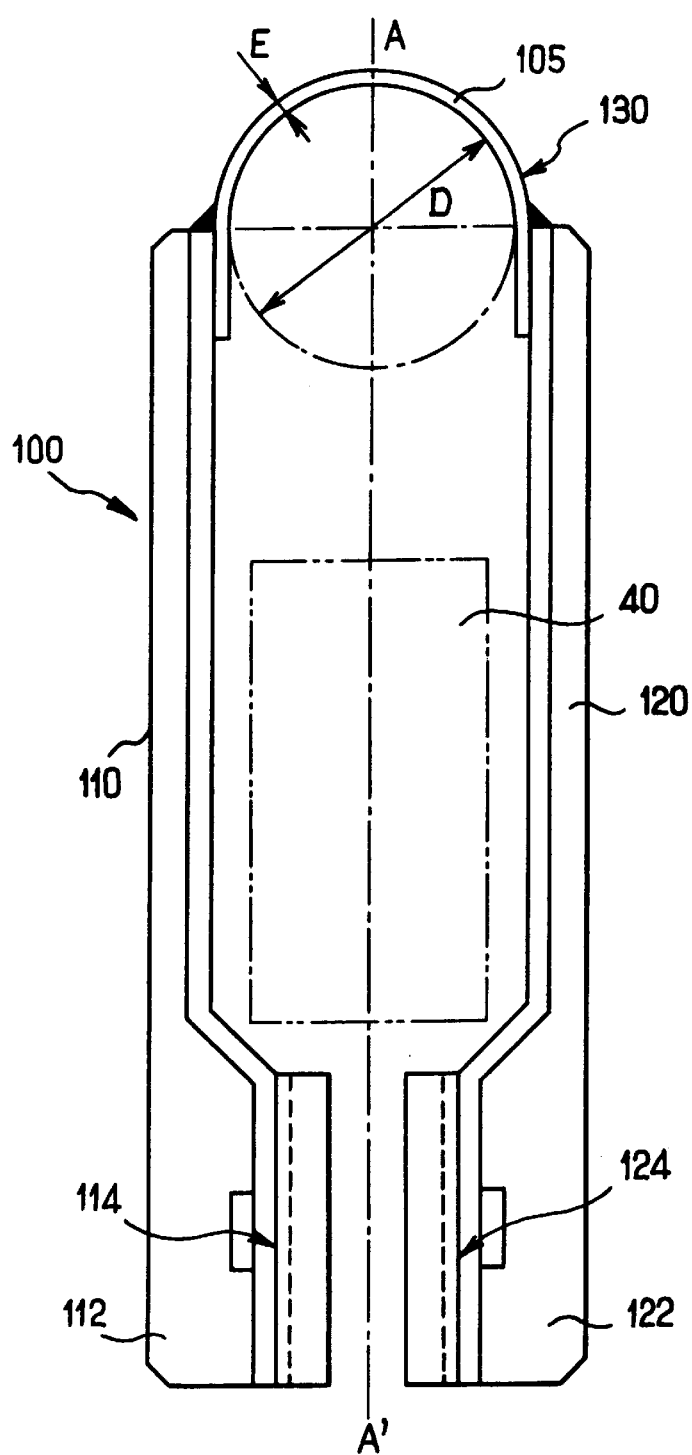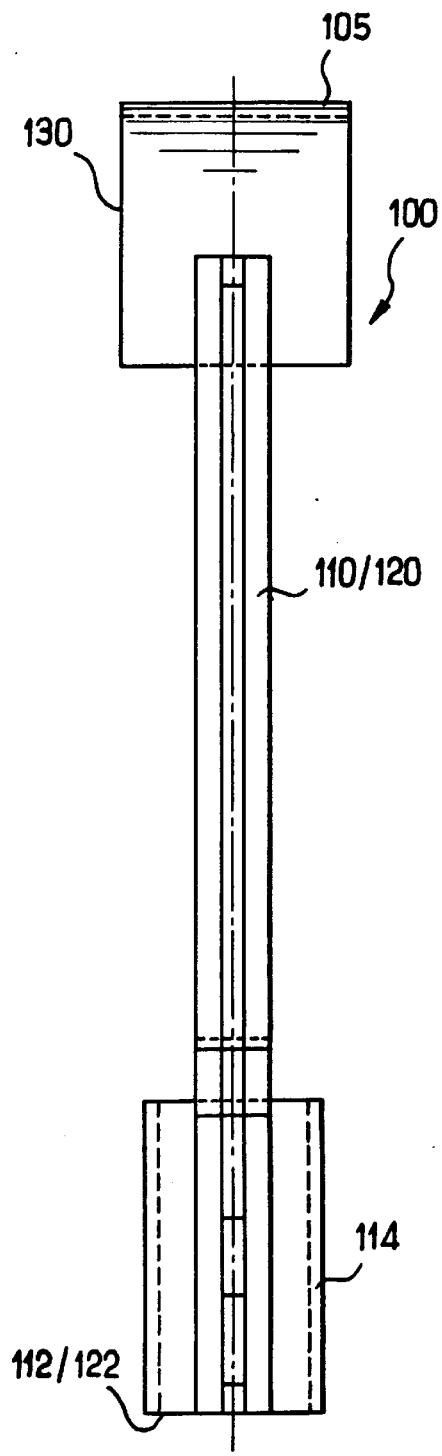
FIG._2   FIG._3

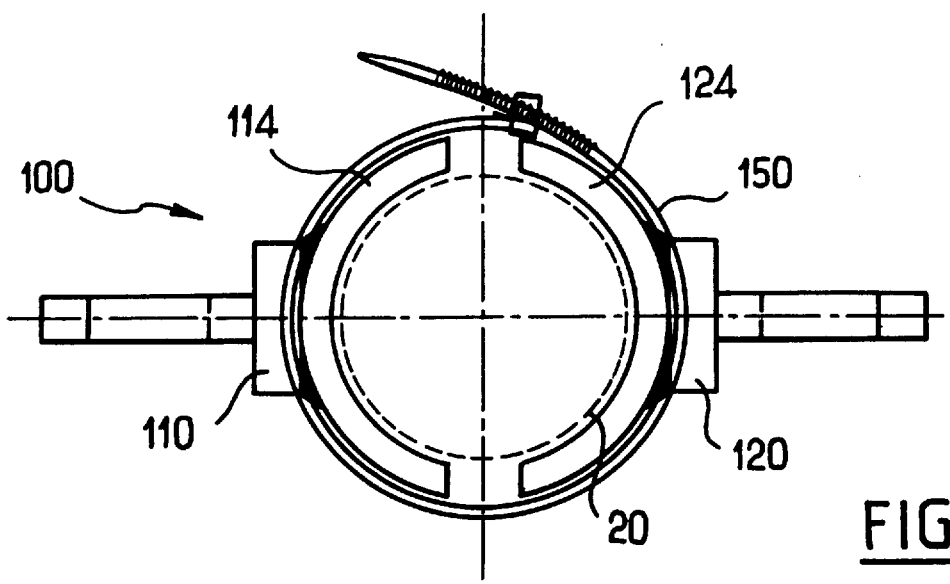
FIG_4
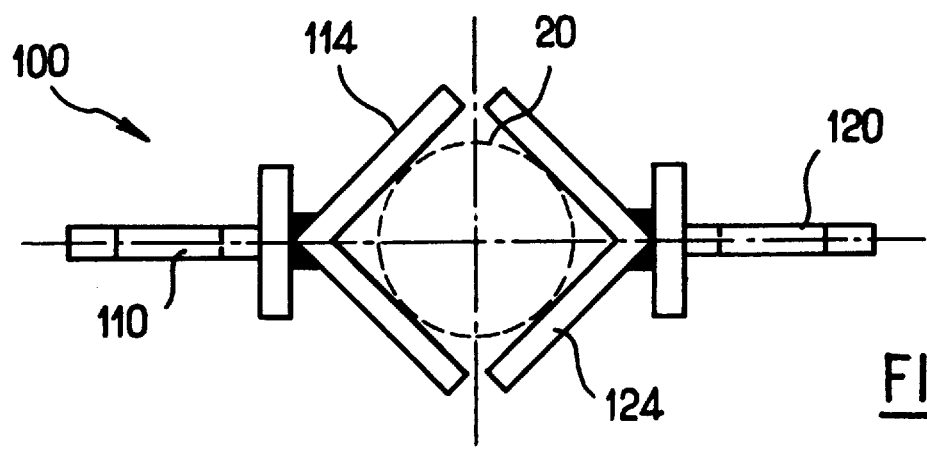
FIG_5
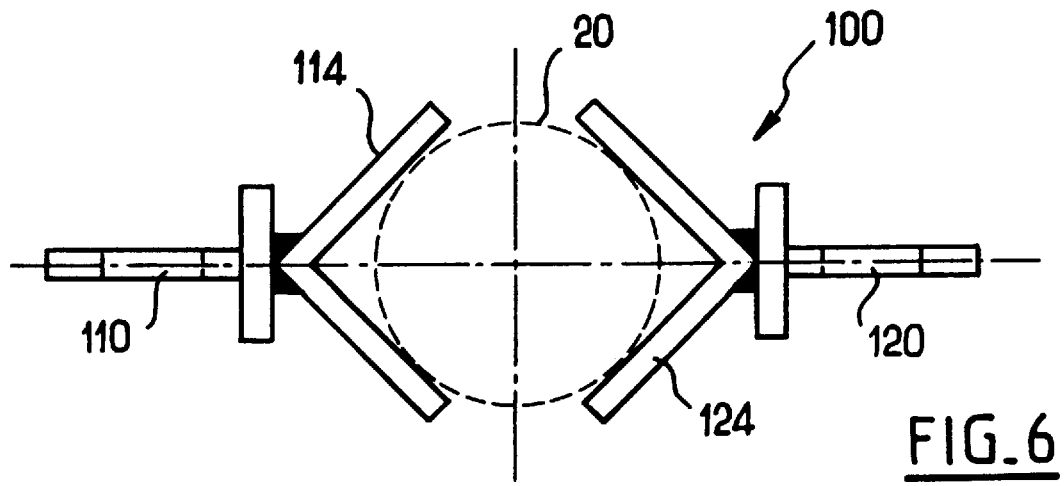
FIG_6

DEVICE FOR HOLDING PIPE ON A BRANCH CONNECTOR

The present invention relates to a device for holding a secondary pipe in position on a branch connector which is to be mounted on a buried main pipe for transporting a fluid (natural gas, for example), and to a process for fitting a secondary pipe to a main pipe using that device, in particular from the top part of an excavation pit.

It is often necessary to install branch connectors on already existing underground pipes, such as gas or water distribution pipes, for example in order to connect consumers to a distribution system.

To that end, an excavation pit of restricted dimensions (in order, especially, to limit disruption to the movement of pedestrians or vehicles) may be produced, which does not allow a person to descend to the bottom of the pit, so that the operations of fitting the connector must be carried out from the top part of the pit (or "outside the pit").

When the pipe and the branch connector are made of heat-meltable material, such as polyethylene, the branch connector is most frequently fixed to the pipe by welding. The body of the branch connector, which generally has the shape of a saddle (upper and, where appropriate, lower), is then equipped with an electrical resistor connected to two supply contacts for connection to a power supply in order to carry out the welding operation by melting the sole of the connector and welding it to the pipe. It is also necessary to introduce the secondary pipe (the diameter of which is generally slightly smaller than that of the main pipe) into a cylindrical sleeve with which the branch connector is equipped and which is arranged laterally with respect to its shaft, generally at a right angle to the main pipe. The sleeve is likewise provided with power supply contacts for the welding of the secondary pipe to the branch connector.

In order correctly to weld together the branch connector and the main pipe on the one hand and the secondary pipe and the branch connector on the other hand, apparatuses are already known which allow the secondary pipe to be positioned and held in place on the main pipe. Those apparatuses rest both on the main pipe and on the secondary pipe, most frequently with the aid of adjustable arms. To that end they generally use grips (or jaws) and/or pincer devices, most frequently with a variable opening allowing them to be adapted to different pipe diameters, which are placed on the said pipes.

However, those apparatuses are relatively complex and fairly expensive. Moreover, they are often bulky and heavy and hence not very practical to manipulate, especially from the top part of a pit having a small cross-section. Their main disadvantage is that they must be fixed both to the main pipe and to the secondary pipe. Finally, another disadvantage of that type of apparatus is that it is impossible to weld the secondary pipe to the branch connector from the top part of the pit because the main pipe, on which the apparatus is supposed to rest, is not accessible. Consequently, it is necessary to lower to the bottom of the pit the branch connector mounted on the pipe by way of the sleeve, with the risk that the said connector will rotate about the pipe or even become detached therefrom.

The object of the invention is, therefore, to remedy the above-mentioned disadvantages and to allow a secondary pipe to be fitted to a main pipe from the top part of an excavation pit of reduced size (cross-section), at low cost, without a specialised apparatus being immobilised for the entire welding and cooling time of the members. Another aim of the invention is to allow a branch connector to be fitted with the aid of equipment that is lightweight, of simple construction, compact and easy to use. The gas supply company is, therefore, able to use this invention more systematically in this type of intervention.

To that end, the invention consists of a device for positioning and holding together a secondary pipe and a branch connector before the said branch connector is mounted on a buried main pipe for transporting fluid, characterised in that the device rests solely on the secondary pipe and on the branch connector, away from the main pipe.

Accordingly, there is no danger that the branch connector and the secondary pipe will become separated. It is also possible to use the device of the present invention for welding the secondary pipe to the branch connector from outside the excavation pit (which was impossible with the devices of the prior art) since the two members are perfectly positioned and immobilised relative to each other by means of the said device.

In order that the branch connector and the secondary pipe are held correctly, the device will preferably rest on a vertical cylindrical shaft of the branch connector and on a portion of the secondary pipe after the latter has been introduced into a lateral sleeve of the branch connector.

According to an additional aspect, the said device will preferably comprise two arms which are at a distance from and parallel to each other, the said arms being joined by a curved end portion, which is able to be mounted around the shaft of the branch connector, and each terminating, at their free end, in a half-shell which is able to surround the secondary pipe.

In order to allow the device to be adapted to different secondary pipe diameters, each half-shell will preferably form a V surrounding the secondary pipe.

In order that the device is held on the secondary pipe correctly, it will be possible to surround the two half-shells with a securing collar.

Still with the same aim and according to an alternative embodiment, the two half-shells may have a substantially semi-circular cross-section and overlap partially in order to form a self-tightening serrated collar.

In order to allow the secondary pipe to be welded to the sleeve of the branch connector, the device will preferably have an opening between its arms allowing access to power supply contacts which are arranged on the sleeve of the branch connector and are intended for the welding of the said sleeve to the secondary pipe.

According to another aspect, the device will preferably be made of rigid plastics material and will be elastically deformable at least at its curved end. Accordingly, it will be possible to move the arms apart easily in order to position the device around the shaft of the branch connector before the half-shells of each arm are placed around the secondary pipe, that operation being facilitated by the "return" elasticity of the curved end portion of the device.

The invention relates also to a process for fitting a secondary pipe to a main pipe by way of a branch connector equipped with a vertical cylindrical shaft and a lateral sleeve, the said process comprising the following steps:

producing an excavation pit of a size that is smaller than that allowing a man to descend into it, and freeing at least the upper circumference of the section of the main pipe on which the branch connector must be fitted, introducing, from the top part of the excavation pit, the secondary pipe into the sleeve of the branch connector, holding the secondary pipe inside the said sleeve by means of the holding device described above, lowering the assembly formed by the branch connector, the secondary pipe and the said holding device to the bottom of the excavation pit, positioning the branch connector on the section of the main pipe, carrying out the operations of welding the branch connector to the main pipe, drilling a hole in the main pipe at the location of the shaft of the branch connector and closing off the shaft, filling in the excavation pit again and leaving the device buried.

The operation of welding the sleeve to the secondary pipe may be carried out either before the assembly is lowered to the bottom of the excavation pit (that is to say, from outside the pit) or once the assembly has been lowered to the bottom of the pit, for example at the same time as the operation of welding the said branch connector to the main pipe.

In the case of the first solution, the operator manipulating the tools from the top part of the pit will be able to concentrate more on joining the branch connector to the main pipe at the bottom of the pit, since he will be relieved of the additional problem of welding the sleeve to the secondary pipe. Moreover, with that solution, there is no risk of the secondary pipe rotating relative to the sleeve as the assembly is lowered to the bottom of the pit.

The invention and the implementation thereof will be seen more clearly with the aid of the following description, which refers to the drawings, in which:

FIG. 1 is perspective view of the device of the invention in the mounted position, FIG. 2 is a cutaway view of the device on its own, FIG. 3 is another cutaway view of the device on its own, FIG. 4 is a third cutaway view of the device showing a variant of FIG. 1, FIGS. 5 and 6 show another variant of FIG. 4, FIG. 7 shows a cutaway view of an excavation pit at the bottom of which there is located a main pipe.

FIG. 1 shows a device 100 for holding a secondary pipe 20 in position on a branch connector 30 which is to be mounted on a main pipe 10.

The secondary pipe 20 typically has a diameter smaller than that of the main pipe 10 and may be, for example, a branch directed towards a house in order to supply it with gas (or water) circulating in the main pipe (10) forming the principal supply system.

The device 100 is independent of the branch connector 30 and of the two pipes 10 and 20. It rests solely on the secondary pipe 20 and on a portion of the branch connector 30, with the exclusion of the main pipe 10, wherein lies its originality. It may also be used from the top part of the excavation pit, as is described further below.

The branch connector 30, which is preferably made of heat-meltable plastics material (polyethylene, for example), comprises:

a hollow shaft 32 which is preferably cylindrical and is substantially vertical once the branch connector 30 has been mounted on the main pipe 10, a saddle 36 which follows the shape of the main pipe 10 and is equipped with contacts 35 for connection to a power supply in order to weld the said branch connector 30 to the main pipe 10 by melting plastics material, and a lateral sleeve 34 which is perpendicular to the said shaft 32 and to the main pipe 10 when those two members are mounted one on the other, the sleeve 34 likewise being equipped with power supply contacts 35 which are used for welding it to the secondary pipe 20.

FIG. 2 shows a cutaway view of the holding device 100 shown in FIG. 1. This device, which is preferably produced, for example, by moulding from plastics material (PVC, ABS, etc.), has two arms 110 and 120 which are at a distance from and substantially parallel to each other. The two arms 110 and 120 extend according to an axis AA', which also acts as the axis of symmetry and is substantially the same as the longitudinal axis of the second pipe 20 when those two members are joined (see also FIG. 1). The length of the two arms 110 and 120 varies according to the diameter of the pipes used. Typically, the length is several tens of centimeters (for example from 10 to 20 centimeters and preferably approximately 15 centimeters). They are connected (or join), at a first end 105, at a curved portion 130 which substantially describes a semi-circle. The curved portion 130 defines a sort of hinge by elastic deformation, which allows the arms 110/120 to open by moving apart slightly (as is described further below) by virtue of the flexibility and the elasticity of the material used, in order to allow the said device 100 to be fitted around the shaft 32 of the branch connector 30. To that end, the inside diameter D of the semi-circular portion 130 is substantially equal to the outside diameter of the shaft 32 of the branch connector 30, and its thickness E is small relative to its diameter. At each free end 112 and 122, each of the arms 110/120 terminates in a half-shell 114/124 which is semi-circular in cross-section and has a central axis AA' and which is intended to surround the secondary pipe 20 (see FIG. 1). FIGS. 4 to 6 show cutaway views of different possible variants of the half-shells 114/124. Accordingly, the device 100 has the form of ice tongs.

In order to secure the connection between the two half-shells 114/124 and the secondary pipe 20, the half-shells may overlap partially (see FIG. 1) and be serrated in such a manner as to define a self-tightening collar 140. That solution is said to be "fully integrated", since the serrated gripping collar 140 is moulded with the rest of the holding device 100.

FIG. 4 shows a variant in which the two half-shells 114/124 do not overlap, there even being a small space between them (for example in order to adapt to different, but relatively similar, diameters of secondary pipe). In that case it is then preferable to use an additional gripping collar 150 of a known type, such as, for example, a common serrated wire-grip collar, a collar of the Serflexâ type (or having a force-control wing nut), or a Snapperâ type collar with double serration. The collar 150 clasps the half-shells 114/124, on the one hand in order to prevent the arms 110/120 from inadvertently opening and moving apart and, on the other hand, in order to provide better axial locking (according to the axis AA') of the secondary pipe 20 inside the sleeve 34.

FIGS. 5 and 6 show another variant in which the two half-shells 114/124 each form a V instead of having a semi-circular cross-section. This solution, which will preferably be equipped with a gripping collar (not shown) of the type used in the solution of FIG. 4, allows the device 100 to be adapted to different diameters of secondary pipe 20, even very different diameters, without the holding of the secondary pipe 20 in the branch connector 30 being adversely affected.

There will now be described, with the aid of FIGS. 1 to 7, the operation of the device 100 within the context of the installation of a branch pipe 20 on a main pipe 10 via a branch connector 30.

In a first step, an excavation pit 200 (see FIG. 7) of small cross-section (40 centimeters by 40 centimeters) is produced in the ground, above the main pipe 10, and at the location at which the junction with the secondary pipe 20 (which is generally connected to a house in order to supply it with gas or water) is to be produced.

Once the excavation pit 200 has been produced, a portion of the main pipe 10 is made accessible, that is to say the earth above it is removed and, if the branch connector 30 also has a lower saddle, as is the case here, the earth beneath it is also removed over a distance of approximately from 15 to 30 centimeters.

From the top part of the pit, the secondary pipe 20 is introduced into the sleeve 34 of the branch connector 30.

The holding device 100 is mounted on the one hand around the shaft 32 of the branch connector 30, by moving the arms 110 and 120 apart slightly so that the curved distal end 105 of the device 100 follows the shape of the said shaft 32, and on the other hand around the secondary pipe 20 with the aid of the two half-shells 110 and 120 and, where appropriate, a gripping collar 140/150. A space 40 is provided between the arms 110 and 120 when they are in position in order to allow access to the branch contacts 35 of the sleeve 34.

Once the secondary pipe 20 and the branch connector 30 are immobilised relative to each other, in particular according to the axis AA' (or the axis xx'), the assembly is lowered to the bottom of the pit.

The branch connector 30 can then be positioned around the main pipe 10. To that end there may be used known techniques such as those described in EP-A-205696 or FRA-2 714 710.

The branch connector 30 is then welded to the main pipe 10 by melting of plastics material, as is described, for example, in EP-B-376 773, while holding it in position.

If it has not already been done at the top part of the pit, the sleeve 34 is also welded to the secondary pipe 20 also with the aid of the supply contacts 35 provided for that purpose and by means of the technique mentioned above (EP-B-376 773).

A hole can then be drilled in the main pipe at the level of the shaft 32 of the branch connector 30, and the said shaft 32 can be stopped up again, as is described in FR-A-2714 710.

Finally, the various tools used (welding, drilling) are removed and the excavation pit is filled in again, the device 100 being left buried.

Of course, the invention is in no way limited to the embodiments which have been illustrated solely by way of examples.

For example, it is also possible to install the holding device 100 from the bottom of the pit, in which case it will be necessary to use special tools which allow the said device 100 to be fitted around the shaft 32 of the branch connector 30 and around the secondary pipe 20, as well as tools for clamping the two half-shells 110 and 120 (or the collar 140/150) around the secondary pipe 20.

What is claimed is:

1. A device for positioning and holding together a secondary pipe and a branch connector before the branch connector is mounted on a buried main pipe for transporting fluid, wherein:

said device rests only on a vertical shaft of the branch connector and on a portion of the secondary pipe, the latter being introduced into a lateral sleeve of the branch connector away from the main pipe;

the device has two arms which are at a distance from and substantially parallel to each other, the arms being joined by a curved end portion, which is adapted to be fitted around the shaft of the branch connector, each of said arms terminating, at their free end, in a half-shell which is adapted to surround the secondary pipe;

the two half-shells are surrounded by a gripping collar.

2. The device according to claim 1, wherein the device is produced from a rigid plastic material and is elastically deformable at its curved end.

3. A device for positioning and holding together a secondary pipe and a branch connector before the branch connector is mounted on a buried main pipe for transporting fluid, wherein:

said device rests only on a vertical shaft of the branch connector and on a portion of the secondary pipe, the latter being introduced into a lateral sleeve of the branch connector away from the main pipe;

the device has two arms which are at a distance from and substantially parallel to each other, the arms being joined by a curved end portion which is adapted to be fitted around the shaft of the branch connector, each of said arms terminating at their free end in a half-shell which is adapted to surround the secondary pipe;

the two half-shells have a substantially circular cross-section and overlap partially, in order to form a serrated self-tightening collar.

4. The device according to claim 3, wherein the device is produced from a rigid plastic material and is elastically deformable at its curved end.

5. An assembly comprising a main pipe, a secondary pipe, a branch connector and a device for positioning and holding together the secondary pipe and the branch connector before the branch connector is mounted on the main pipe, wherein:

the branch connector has a saddle disposed on the main pipe, a hollow shaft extending perpendicular to the saddle, and a lateral sleeve having an axis perpendicular to the shaft, the secondary pipe extending coaxially through the sleeve;

the device comprises tongs having two arms joined by a curved end portion elastically deformable and fitted around the shaft of the branch connector;

the device rests solely on the secondary pipe and on the branch connector, away from the main pipe; and the arms have a first and a second free end provided with opposite half-shells between which the secondary pipe is interposed.

6. The assembly according to claim 5, wherein:

the assembly further comprises power supply contacts arranged on the sleeve to the secondary pipe;

the devise having an opening between said arms for providing access to the power supply contacts.

7. The assembly according to claim 5, wherein each half-shell forms a V surrounding the secondary pipe.

8. The device according to claim 5, wherein the device is produced from a rigid plastic material and is elastically deformable at its curved end.

9. A device for positioning and holding together a secondary pipe and a branch connector before the branch connector is mounted on a buried main pipe for transporting fluid, wherein said device rests solely on the secondary pipe and on the branch connector, away from the main pipe;

wherein said device rests on a vertical cylindrical shaft of the branch connector and on a portion of the secondary pipe after the latter has been introduced into a lateral sleeve of the branch connector;

wherein said device has two arms which are at a distance from and substantially parallel to each other, the arms being joined by a curved end portion, which is adapted to be fitted around the shaft of the branch connector, each of said arms terminating, at their free end, in a half-shell which is adapted to surround the secondary pipe; and wherein each half-shell forms a V surrounding the secondary pipe.

* * * * *